(12) United States Patent
Alden et al.

(10) Patent No.: US 11,123,779 B2
(45) Date of Patent: Sep. 21, 2021

(54) METHOD AND A CHEMICAL COMPOSITION FOR ACCELERATED IN SITU BIOCHEMICAL REMEDIATION

(71) Applicant: Tersus Environmental LLC, Wake Forest, NC (US)

(72) Inventors: David F. Alden, Scranton, PA (US);
Gary M. Birk, Wake Forest, NC (US);
Sangho Bang, Durham, NC (US);
Jeffrey H. Harwell, Norman, OK (US);
Bor Jier Shiau, Norman, OK (US)

(73) Assignee: Tersus Environmental LLC

( * ) Notice: Subject to any disclaimer, the term of this patent is extended or adjusted under 35 U.S.C. 154(b) by 0 days.

(21) Appl. No.: 16/585,862

(22) Filed: Sep. 27, 2019

(65) Prior Publication Data
US 2020/0261954 A1    Aug. 20, 2020

Related U.S. Application Data

(63) Continuation-in-part of application No. 16/278,328, filed on Feb. 18, 2019.

(51) Int. Cl.
| | | |
|---|---|---|
| *B09C 1/06* | (2006.01) | |
| *C02F 1/70* | (2006.01) | |
| *B09C 1/08* | (2006.01) | |
| *B01J 20/02* | (2006.01) | |

(Continued)

(52) U.S. Cl.
CPC .............. *B09C 1/08* (2013.01); *B01F 17/00* (2013.01); *B01F 17/0057* (2013.01); *B01J 20/0229* (2013.01); *B01J 20/0285* (2013.01); *C02F 1/705* (2013.01); *C02F 2103/06* (2013.01)

(58) Field of Classification Search
CPC .. B01F 17/0057; B01F 17/00; B09C 2101/00; B09C 1/002; B09C 1/08; C02F 1/705; C02F 2103/06; C02F 1/28; C02F 1/288; C02F 2305/00; C02F 2305/06; B01J 20/0285; B01J 20/0229; C01G 49/12
See application file for complete search history.

(56) References Cited

U.S. PATENT DOCUMENTS

| | | | |
|---|---|---|---|
| 6,664,298 B1 * | 12/2003 | Reinhart ............ | B01D 17/0202 516/22 |
| 6,906,235 B2 * | 6/2005 | Funakoshi ............... | A62D 3/33 210/912 |
| 7,037,946 B1 | 5/2006 | Reinhart et al. | |

(Continued)

OTHER PUBLICATIONS

Gu et al., "Mechanochemically Sulfidated Microscale Zero Valent Iron: Pathways, Kinetics, Mechanism, and Efficiency of Trichloroethylene Dechlorination," Environ. Sci. Technol. 51:12653-12662, 2017.

(Continued)

*Primary Examiner* — Timothy C Vanoy
(74) *Attorney, Agent, or Firm* — Belles Katz LLC

(57) ABSTRACT

The present subject matter illustrates a method for accelerated in-situ chemical reduction of subsoil matter. The method comprises supplying a mixture comprising ferrous sulfide into soil pathways to biologically react with dissolved contaminates in the groundwater. Further, an organic hydrogen donor is supplied into the soil-pathways to produce anaerobic-conditions to cause indigenous anaerobic bacteria to biodegrade residual concentrations of the contaminates.

38 Claims, 7 Drawing Sheets

(51) Int. Cl.
   *B01F 17/00* (2006.01)
   *C02F 103/06* (2006.01)

(56) References Cited

U.S. PATENT DOCUMENTS

| | | | |
|---|---|---|---|
| 7,128,841 B2 * | 10/2006 | Zhang | B09C 1/002 |
| | | | 210/747.8 |
| 7,611,637 B2 | 11/2009 | Zhang et al. | |
| 9,352,987 B2 * | 5/2016 | Noland | C02F 1/283 |
| 2001/0042723 A1 * | 11/2001 | Sivavec | B09C 1/002 |
| | | | 210/749 |
| 2004/0007524 A1 | 1/2004 | Noland | |
| 2005/0006306 A1 * | 1/2005 | Noland | B01J 21/18 |
| | | | 210/610 |
| 2007/0225542 A1 * | 9/2007 | Higgins | B09C 1/08 |
| | | | 588/256 |
| 2008/0272051 A1 | 11/2008 | Baseeth | |
| 2016/0289106 A1 | 10/2016 | Freim, III | |
| 2018/0099877 A1 | 4/2018 | Chang | |
| 2020/0031695 A1 * | 1/2020 | Bhattacharjee | B09C 1/00 |
| 2020/0038926 A1 * | 2/2020 | Freim, III | C02F 1/283 |
| 2020/0261953 A1 | 8/2020 | Bang | |
| 2020/0261954 A1 | 8/2020 | Alden | |

OTHER PUBLICATIONS

Lan, "Characterization of the Iron Sulfide Oxidation Products Formed During Reductive Dechlorination of Chlorinated Aliphatic Contaminants," University of Oklahoma, Dissertation, 2016.

Lan, "Controlled Sulfidation to Optimize the Remediation Performance of Zerovalent Iron and Related Materials," Tersus 2018 Webinar Series, Jun. 21, 2018.

Su et al., "Chapter 9: Sulfide-Modified NZVI (S-NZVI): Synthesis, Characterization, and Reactivity," *Nanoscale Zerovalent Iron Particles for Environmental Restoration*, Springer International Publishing AG 2019, pp. 359-386.

Yang, Z., Xu, H., Shan, C., Jiang, Z., Pan, B., Effects of brining on the corrosion of ZVI and its subsequent As(III/V) and Se(IV/VI) removal from water, Chemosphere (2017), doi: 10.1016/j.chemosphere.2016.12.029.

* cited by examiner

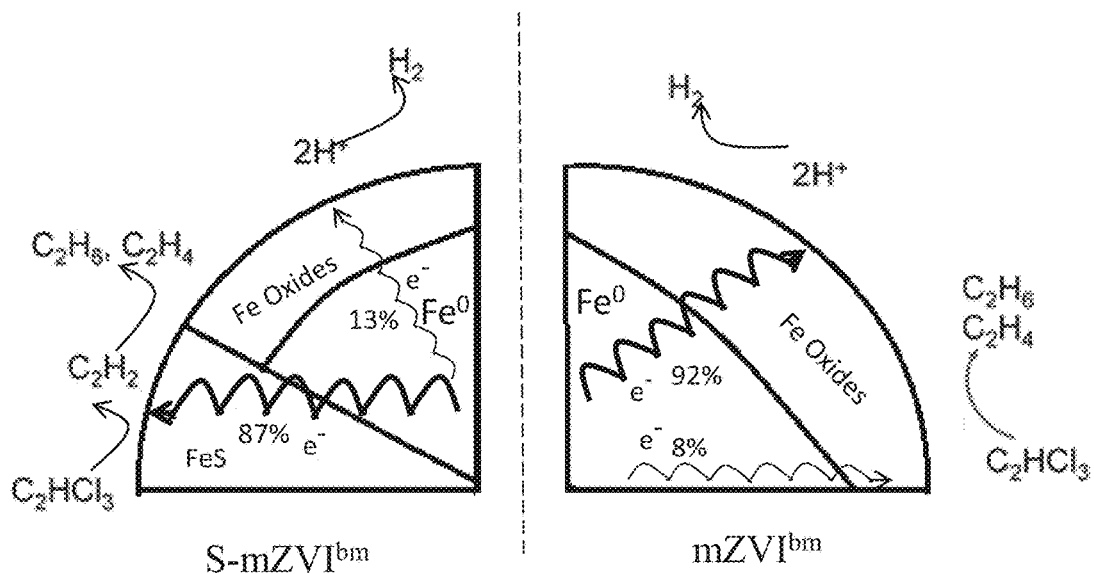
Figure 2
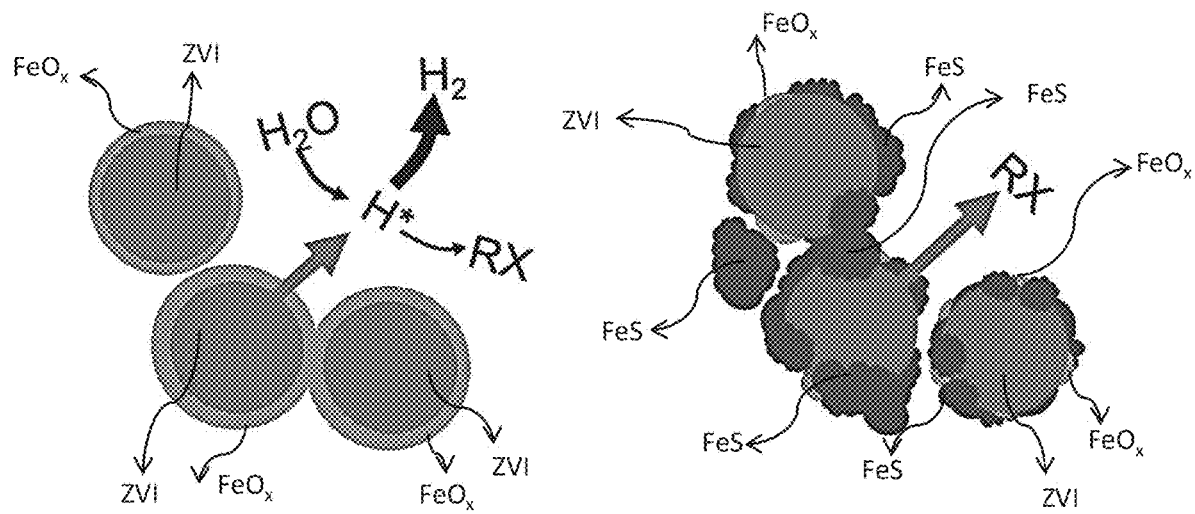
Figure 3(a)
Without sulfidation
Figure 3(b)
With sulfidation

METHOD AND A CHEMICAL COMPOSITION FOR ACCELERATED IN SITU BIOCHEMICAL REMEDIATION

CROSS-REFERENCE TO RELATED APPLICATIONS

This application is a continuation-in-part of U.S. patent application Ser. No. 16/278,328, filed Feb. 18, 2019, entitled "Zero-Valent Metal Suspension in non-aqueous phase for Water Remediation," which is herein incorporated by reference in its entirety.

TECHNICAL FIELD

This present subject matter relates to remediation of sub-surface soil and/or groundwater which may be toxic to living beings and/or environment, and/or wastewater discharged from industrial and commercial-facilities.

BACKGROUND

With increased concerns over protecting the environment and public health and safety, the identification and removal of contaminant materials in the environment, especially from subsurface soils and aquifers, has become increasingly important yet increasingly challenging as well. Years of unregulated dumping of hazardous materials have severely contaminated the groundwater in many areas, creating significant health concerns and causing extensive damage to the local ecosystem. As a result, in recent years significant emphasis has been placed upon the clean-up and remediation of contaminated groundwater and the environment surrounding dump sites, which has led to the creation of a new industry of environmental clean-up and remediation. However, conventional technologies being used for remediation for contaminated sites often are expensive, may require years to perform, and are not always effective.

Widespread use and inappropriate waste handling of toxic contaminants such as solvents, petroleum hydrocarbons, pesticides, heavy metals and explosives, contaminated ground water is commonplace in many sites around the world. Chlorinated solvents, such as trichloroethane (TCE) and perchloroethylene (PCE), are used in dry cleaning operations, as degreasers and as cleaners in a variety of industries. Petroleum hydrocarbons commonly found in ground water include gasolines, diesels and other fuels, as well as volatile compounds such as BTEX (benzene, toluene, ethylbenzene, and xylenes), MTBE (Methyl tert-butyl ether) and other toxic volatiles and semi-volatile petroleum hydrocarbon-derived compounds. Additional groundwater and soil contaminants comprise naphthalene or polycyclic aromatic hydrocarbons (PAHs) created from combustion, coal coking, petroleum refining and wood-treating operations; and polychlorinated biphenyls (PCBs), once widely used in electrical transformers and capacitors and for a variety of other industrial purposes, pesticides, and herbicides.

Various ex-situ and in-situ methods have been utilized for the treatment, remediation or disposal of contaminated soil. Ex situ methods generally include permanent removal of the contaminated soil to a secure landfill, incineration, indirect thermal treatment, aeration, venting, and air-sparging. Other elaborate and expensive techniques that have been utilized involve excavation and treatment of the contaminated soil using multistep unit operations for separating and recovering the soil from the contaminant. A common ex-situ technique for treating contaminated matter is the "pump-and-treat" method in which contaminated groundwater is pumped to the surface, cleaned chemically or by passing the groundwater through a bioreactor, and then re-injected into the groundwater. This process is carried out over a long period and various factors complicate the removal of these contaminants from the environment. For example, "pump-and-treat" systems are not very effective in removing denser than water non-aqueous phase liquid (DNAPL) contaminants which act as a continuous source of groundwater contamination plumes. The "pump-and-treat" method therefore proves problematic in long run.

An example in situ method for treating contaminated groundwater in its native place involves the construction of in-situ filters or "permeable reactive barriers" (PRBs) that contain reactive or adsorptive material that remove contaminants from groundwater seeping through them.

"In Situ Bioremediation" takes advantage of certain microorganisms that are capable of contaminant destruction. They can be temporarily stimulated or added to contaminated zones to interact with target contaminants and transform them to non-toxic end-products. In this technique, specialized strains of bacteria metabolize various hydrocarbons such as gasoline, crude oil, or other hydrocarbon-based contaminates and gradually reduce them to carbon dioxide and water. Another example bioremediation technique is the stimulation or addition of anaerobic microorganisms which have the capability to decompose a wide range of highly chlorinated compounds.

"In Situ Chemical Reduction" (ISCR), an innovative environmental remediation technique used for soil and/or groundwater remediation that combines both biological processes and oxidizable metals such as zero-valent iron (ZVI) that drive abiotic pathways to chemically reduce persistent organic compounds such as chlorinated solvents, pesticides and energetics into harmless end products. ISCR generally involves the co-injection of ZVI and an organic electron donor such as soybean oil to enabling various chemical reduction pathways of chlorinated solvents and other contaminants.

When Iron or Iron compounds are used for the purification of water impacted by various contaminants, it can react with a naturally-occurring or man-made contaminants such as arsenic As(III/V) and selenium Se(IV/VI) or carbon tetrachloride ($CCl_4$), chloroform ($CHCl_3$), trichloroethene ($C_2HCl_3$), and tetrachloroethene ($C_2Cl_4$). For example, trichloroethene is reduced to ethane and chloride in the presence of iron according to the following reaction:

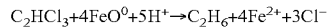

$$C_2HCl_3 + 4FeO^0 + 5H^+ \rightarrow C_2H_6 + 4Fe^{2+} + 3Cl^-$$

However, as may be observed from scanning electron microscope (SEM) images provided in FIG. 1, ZVI's corrosion is enhanced by brine solutions, or similarly, in groundwater. Corrosion on ZVI changes the surface properties of ZVI particles and its contaminant removal performance. Accordingly, there lies at least a need to avoid an inadequate ZVI corrosion in aqueous phase. Maturation and diversification of the use of ZVI for water treatment and the role of iron sulfide minerals in abiotic contaminant transformation processes has created an interest in controlled sulfidation of iron-based materials for water treatment. Iron in groundwater creates effective remediation pathways when mineralized and precipitated into pyrite ($FeS_2$), iron sulfide or nanocrystalline mackinawite (FeS), which, under strong reducing conditions and available organic carbon, is ultimately responsible for the reaction and detoxification of several contaminants. Sulfide-modified zero-valent iron (S-ZVI) has thus emerged as a popular choice for remediation due to its ability to achieve much higher contaminant removal efficacy than unmodified ZVI due to its selectivity to pollutants over water (*Environ. Sci. Technol.* 2017). For dechlorination, for example, sulfidation has been observed to not only inhibit the reaction between Fe(0) and $H_2O$, but also create a nucleophilic-zone on the particle surface which is favorable for β-elimination. (Yining Su, Gregory V. Lowry, David Jassby, and Yalei Zhang, 2019).

FIG. 2 illustrates schematics of reactions with respect S-ZVI at left-side and unmodified ZVI at right-side. As has been proven experimentally, in a time span of 8 days, S-ZVI has been shown to cause at least a 56% reduction in TCE as compared to 4% reduction in TCE as other achieved through unmodified ZVI.

FIG. 3 depicts effects of sulfidation on organic contaminants through a mechanistic model based on aqueous solid sulfidation and Nano-ZVIs. The arrow sizes correspond to reactivity. FIG. 3a depicts case of non-sulfidation, wherein the ZVI generates both hydrogen ($H_2$) to promote biological-processes and electrons for abiotic-pathways. FIG. 3b depicts the case of sulfidation, wherein the production of electrons for abiotic-pathways dominate the reactions. Overall, sulfidation increases dechlorination rates, and simultaneously hydrogen production is suppressed. Accordingly, sulfidation may improve the efficiency of utilization of reducing equivalents for contaminant removal and may also favor desirable pathways of contaminant-removal, such as (i) dechlorination by reductive elimination rather than hydrogenolysis and (ii) sequestration of metals as sulfides that could be resistant to re-oxidation.

Aquifer-remediation typically uses injection-techniques to distribute amendments such as vegetable oils and ZVI into the contaminated groundwater region. Small iron particles (i.e., iron powders) typically sink when submerged in a liquid such as water and could not remain in suspension enough time to allow injecting it with the water. ZVI slurries or suspensions are thus made by mixing the ZVI particles with carrier fluids such as water and a dispersant or thickening agent so they can be pumped or percolated directly into the aquifer. Similarly, oil-in-water emulsions are created to allow dispersing vegetable oil, a non-aqueous phase fluid, in subsurface porous media. Although these methods have been shown to be effective for cleaning contaminated groundwater, challenges remain in being able to distribute ZVI or vegetable through large contaminated volumes of aquifer, relying on expensive injection mechanisms or a high-density grid of injection points. Despite the presence of aforesaid contaminant removal mechanisms of bioremediation or ISCR, there remains a long-standing need of amendments that are easily distributed in the subsurface while being rapid and cost-effective products for in-situ remediation of soil and/or groundwater contamination.

SUMMARY

This summary introduces a selection of concepts that are further described in the Detailed Description of Some Embodiments section of the present disclosure. This summary is neither intended to identify key or essential inventive concepts of the disclosure, nor is it intended for determining the scope of the invention or disclosure.

The present subject matter illustrates method for accelerated in-situ chemical reduction of subsoil matter. The method comprises supplying a mixture comprising ferrous sulfide into soil-pathways to stimulate biogeochemical reactions with dissolved contaminates in the groundwater. An organic hydrogen donor is also supplied into the soil pathways to produce or sustain anaerobic conditions and to stimulate certain microorganisms to participate in the biodegradation process of contaminants.

To further clarify advantages and features of the invention claimed herein, example descriptions and embodiments are rendered by reference to specific embodiments thereof, which is illustrated in the appended drawings. It is appreciated that these drawings depict only example embodiments of the invention and are therefore not to be considered limiting of its scope. The disclosure will be described and explained with additional specificity and detail with the accompanying drawings.

BRIEF DESCRIPTION OF THE DRAWINGS

The above and other features, aspects, and advantages of the present disclosure will become better understood when the following detailed description is read with reference to the accompanying drawings in which like characters represent like parts throughout the drawings, wherein:

FIG. 2 is a schematic representation of reactions with respect to employment of ZVI with or without sulfidation for remediation.

FIG. 3 depicts effects of sulfidation on contaminants through a mechanistic model.

FIG. 8 (a to c) is a schematic representation of a method for soil treatment according to the present FeS-ZVI-Electron Donor formulation comprising ferrous-sulfide when introduced below the earth's surface, thereby illustrating another example application of FeS-ZVI-electron donor formulation during in situ soil remediation, in accordance with an embodiment of the present disclosure. FIG. 8 may be categorized as follows:

Figure 1:
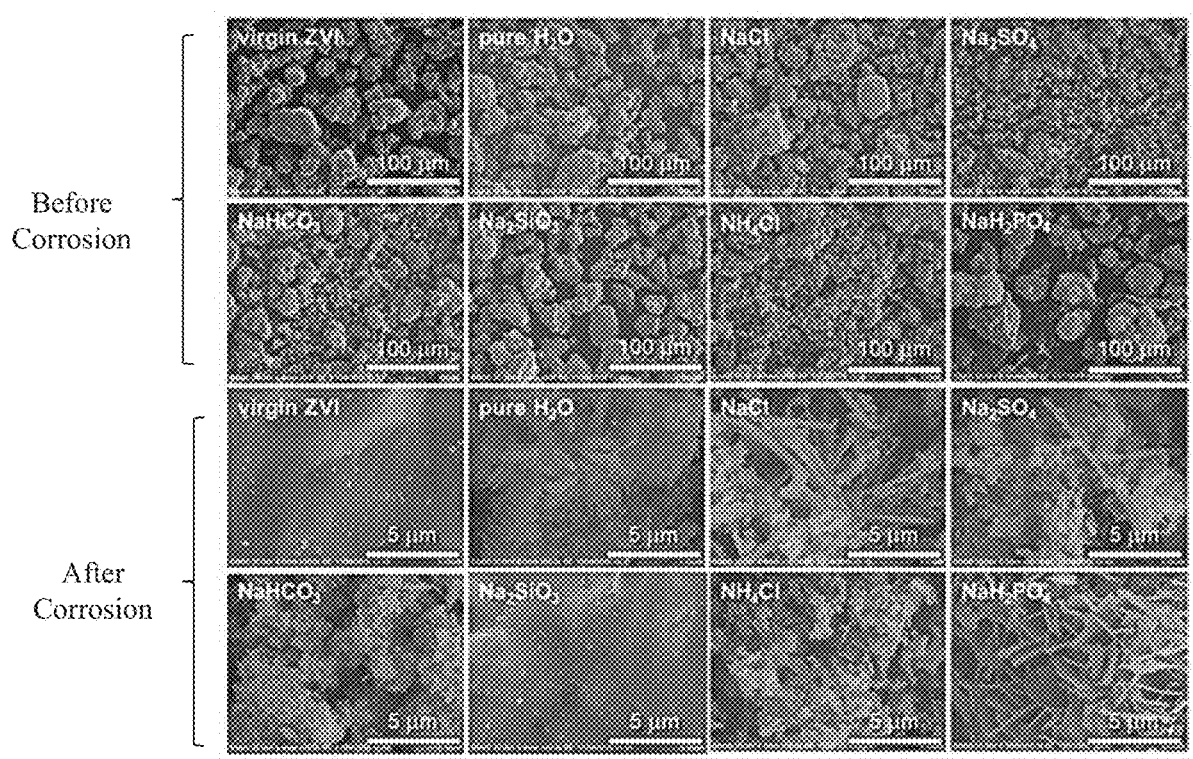
FIG. 1 consists of various Scanning electron microscope (SEM) images of ZVI before and after exposure to brine solutions to illustrate its corrosion.

The elements in the drawings are illustrated for simplicity and may not have been necessarily drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF SOME EXAMPLE EMBODIMENTS

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

Sulfide-modified zero-valent iron forms ferrous sulfide (FeS) promotes abiotic pathways. FeS is highly reactive with chlorinated organic compounds. Tetrachloroethene (PCE) is reduced by FeS to acetylene via β-elimination (dominating reaction), to trichloroethene (TCE) via hydrogenolysis, and to 1,1-dichloroethene (DCE) via α-elimination; TCE transforms to acetylene also via β-elimination (dominating reaction) and to DCE via hydrogenolysis (Jeong et al. 2007a, b).

As a part of ISCR based remediation process, the present subject matter at least refers to co-injecting a mixture of organic hydrogen donors and iron sulfide-based reagents for remediation. Further, the present subject matter describes a Zero-Valent Metal and FeS based suspension with a liquid organic carbon for Water Remediation.

Embodiments of the present disclosure will now be described below in detail with reference to the accompanying drawings.

Figure 4:
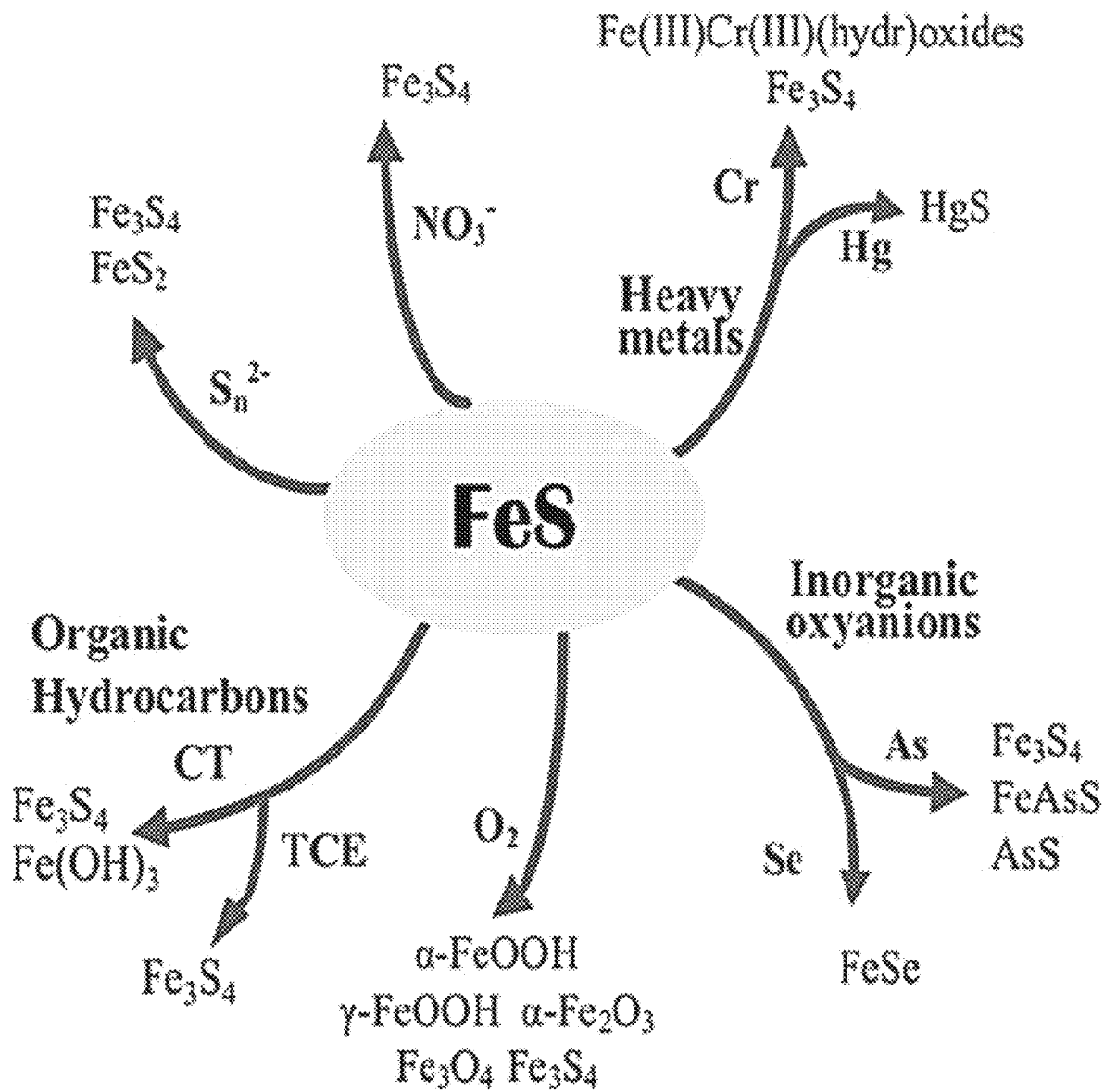
FIG. 4 illustrates a schematic representation of FeS transformation products by various environmental species during remediation.
Figure 5:
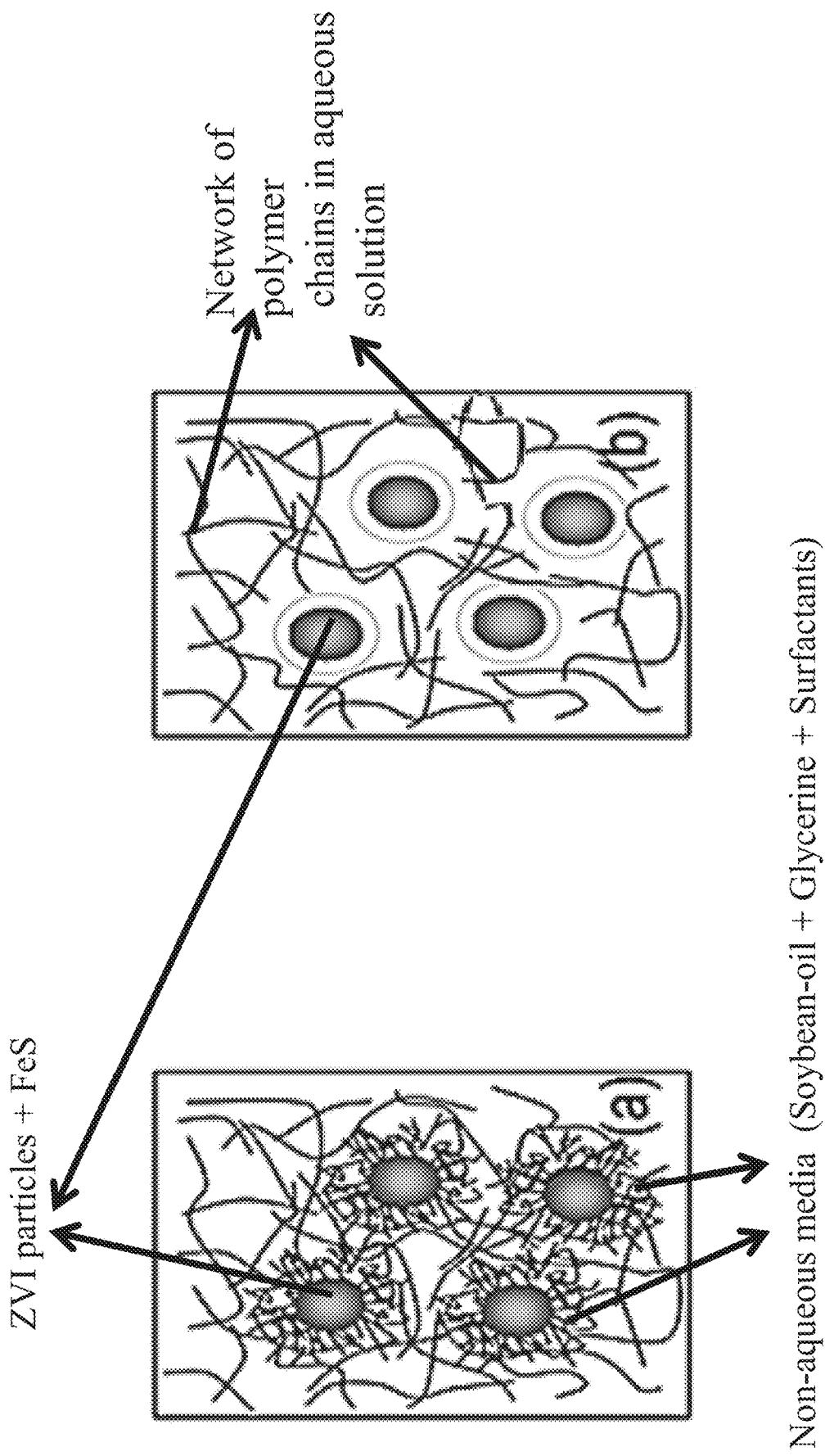
FIG. 5 is a graphical representation illustrating the difference between Steric stabilization and dispersion in a liquid gel and thereby representing at least two types of example suspension networks in an FeS-ZVI-Electron Donor formulation comprising zero-valent iron and ferrous-sulfide, in accordance with an embodiment of the present disclosure.
Figure 6:
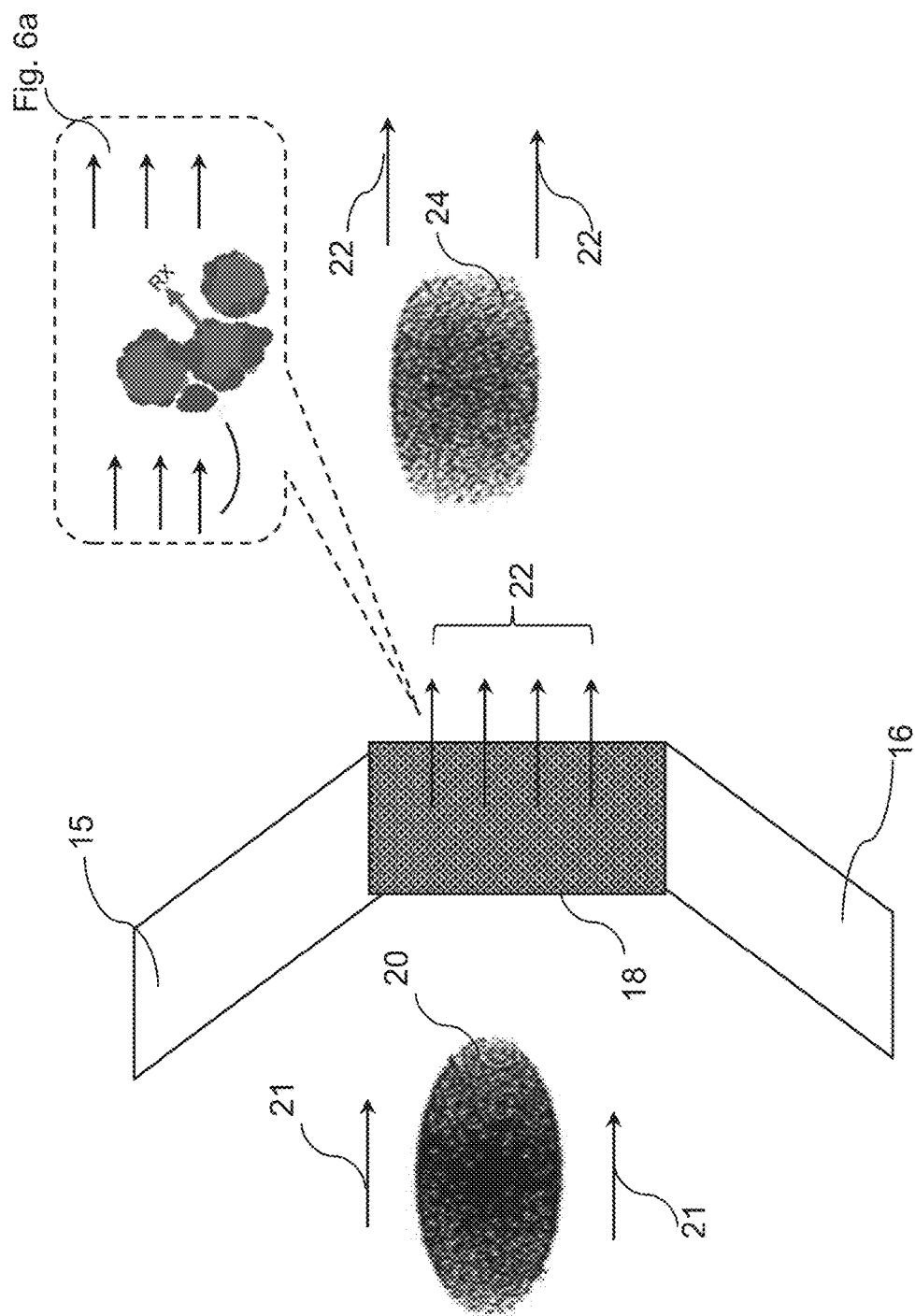
FIG. 6 is a schematic representation of a method for treating groundwater using a permeable reactive barrier and thereby representing example application for the present FeS-ZVI-electron donor formulation during groundwater remediation, in accordance with an embodiment of the present disclosure.
Figure 7:
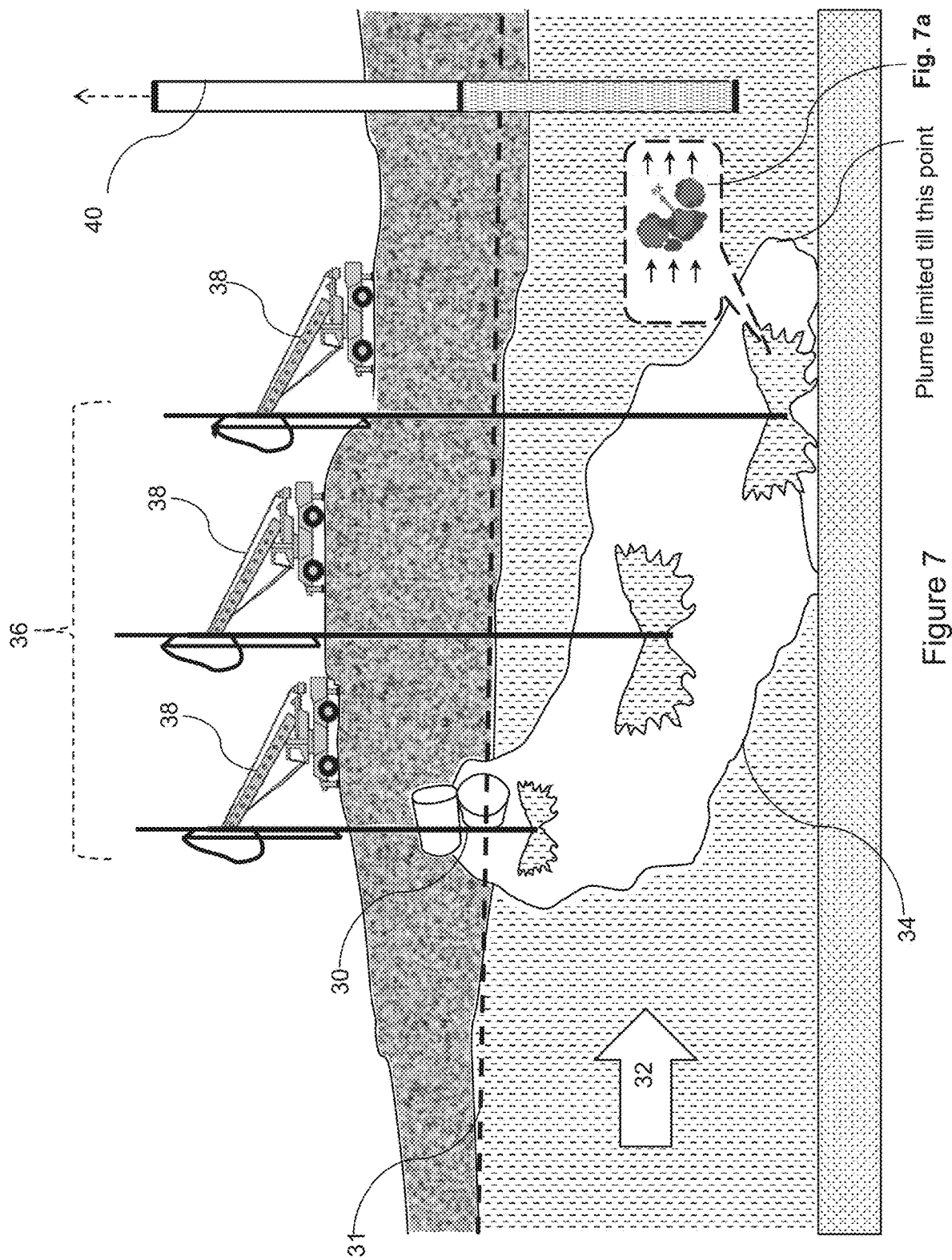
FIG. 7 is a schematic representation of a method for groundwater treatment according to the present FeS-ZVI-electron donor formulation when introduced into the groundwater via an injection well, thereby illustrating another example application of FeS-ZVI-electron donor formulation during ground water remediation, in accordance with an embodiment of the present disclosure.

While FIG. 4 illustrates a schematic-representation of FeS transformation products by various environmental-species during remediation, the description of FIG. 6, FIG. 7 and FIG. 8 describe methods for accelerated in-situ chemical reduction of subsoil matter. The method comprises the steps of supplying a mixture comprising ferrous sulfide and an organic hydrogen donor into soil pathways to biologically react with dissolved contaminates in the groundwater. The contaminates to be targeted may be at least one of chlorinated solvents, haloalkanes, perchlorate, energetics, Energetics (DNT, HMX, Nitroglycerine, Perchlorate, RDX, and TNT), uranium, chromium. The ferrous sulfide is at least one of: iron sulfide, iron sulfide, iron(II) sulfide, ferrous sulfide, iron sulfide, iron sulfide or iron(II) sulfide, Mackinawite structured iron sulfide-based reagents, etc.

Further, the method supplying an organic hydrogen donor into the soil pathways to produce anaerobic conditions to cause indigenous anaerobic bacteria to biodegrade residual concentrations of the contaminates. The organic hydrogen donor are low-molecular-weight organic compounds comprising at least one of lactate, acetate, methanol, formate, glycerol, glucose and combinations thereof. In other example, the organic hydrogen donor may be one or more of high-molecular-weight organic compounds $C_4$-$C_{22}$ vegetable oil selected from the group consisting of soybean oil, coconut oil, rapeseed (canola) oil, peanut oil, crambe oil, sunflower oil and combinations thereof.

In an implementation, the present method steps may be implemented through a gas- or liquid-based, closed delivery system. Injection points are advanced via traditional direct push technology or may be permanently installed injection wells (as also depicted in FIG. 7 and corresponding description). In an example, as a first stage, the gas is introduced at a pressure of approximately 175 psi such that delivery pathways and voids are established. Pathway development may be verified through state of the art mechanisms, i.e. by observing a substantial pressure-drop at the surface monitoring point. Gas introduction is immediately halted once the pressure drop is detected.

Further, the next stage (i.e. second stage) corresponds to injection of a mixture comprising the ferrous sulfide. The mixture may further comprise organic hydrogen donor, nutrients and micronutrients. Specifically, a solution of ferrous sulfide, organic hydrogen donor and nutrients (nitrogen and ortho-phosphate) is immediately injected into the subsurface pathways. As explained in FIG. 4, FeS reduces concentrations of dissolved-phase CVOCs and provides rapidly generated hydrogen, hydroxides and as a result causes overall microbial stimulation and biofilm-formation. An anaerobic organic hydrogen source is also injected during or immediately after the FeS injection to provide a slow release hydrogen source for the anaerobic dechlorination of the CVOCs. Vitamin B12 and riboflavin B2 can be mixed with the anaerobic stimulating hydrogen source to provide essential micro enzymes at the anaerobic sites. Organic hydrogen donor allows sustaining anaerobic conditions and provides hydrogen for dehalo-elimination processes that detoxify CVOCs or allow other anaerobic remediation processes. Nutrients, injected as organic ammonia and ortho-phosphate, are required for the maintenance of the microbial metabolic pathways, ATP/ADP synthesis and organelle development. Stage 3 is optional in nature and corresponds to a reinjection or second time injection of the mixture of Stage 2. Likewise, the gas injection of Stage 1 may also be optionally repeated as a part of present stage 3. Such re-injection of mixtures and gases may be performed to clear the injection lines and to enhance in-situ mixing and greater penetration of the anaerobic stimulating products into soil.

FIG. 4 illustrates a schematic representation of FeS transformation products by various environmental species during remediation. The representation in FIG. 4 corresponds to the figure published by Lan, Ying, Ph.D. dissertation, University of Oklahoma, 2016.

The ferrous sulfide as forming a part of the mixture of the current invention is a highly reactive phase and applied to the treatment of groundwater contaminants, such as heavy metals, chlorinated aliphatic contaminants, arsenic (As) and selenium (Se) (Gong et al., 2016). In an example, during the reactions with heavy metals, FeS can remove mercury (Hg) through adsorption, precipitation of HgS, as well as the formation of surface complexes (Jeong et al., 2007). Chromium (Cr) (VI) can be reduced by FeS to Cr(III), which is insoluble and less toxic compared to Cr(VI), accompanied by the formation of greigite and an Fe(III) and Cr(III) hydroxide layer on the FeS surface (Mullet et al., 2004). FeS can also react with inorganic oxyanions, such as As and Se. The removal of As(III) may be achieved through the precipitation of AsS (Han et al., 2011b) or FeAsS (Bostick and Fendorf, 2003) at low pH values; whereas, as the pH increases, the As(III) is removed mainly through surface sorption (Han et al., 2011b). During the removal of As(III), FeS is oxidized into greigite (Gallegos et al., 2008). Formation of outer sphere surface complexation may be a predominant mechanism of As(V) removal by FeS in aqueous solution (Farquhar et al., 2002; Wolthers et al., 2005). Sorption and reduction may also be important mechanisms of the removal of Se by FeS from aqueous solution, and FeSe is found on the FeS surface (Breynaert et al., 2008; Han et al., 2011a). Overall, the FeS-associated products during the reactions with heavy metals and inorganic oxyanions are greigite, sulfide precipitates, and iron (hydr) oxides layers on the FeS surface.

Chlorinated aliphatic contaminants comprise Tetrachloroethylene (PCE), trichloroethylene (TCE) and carbon tetrachloride (CT) as the most frequently detected Chlorinated Aliphatic Contaminants or volatile organic compounds. FeS causes abiotic dechlorination of CT, TCE, and PCE. The products during the dechlorination may be sulfide precipitates, and iron (hydr)oxides layers on the FeS surface.

Further, in respect of another embodiment of the present subject matter as has been depicted in FIG. 5 to FIG. 8, the present subject matter at least illustrates a combined suspension of ferrous sulfide, zero-valent metal and organic hydrogen donor liquids. More specifically, a composition for a FeS, zero-valent metal and organic electron donor suspension is disclosed. The composition comprises a) a ferrous sulfide, b) a particulate zero-valent metal; c) a surfactant; d) a vegetable oil; and e) a thickening agent.

The ferrous sulfide may be iron sulfide, iron sulfide, iron(II) sulfide, ferrous sulfide, iron sulfide, iron sulfide or iron(II) sulfide, Mackinawite structured iron sulfide-based reagents. The ferrous sulfide is present within the suspension in an amount ranging from 0.05 to 15.0% by weight. The microscale Mackinawite structured iron sulfide-based reagents are 1 to 45 microns in diameter, preferably an average particle size (D50) of 10 microns or less.

The zero-valent metal particles are a plurality of microscale zero-valent metal particles, preferably an iron-based powder. Said plurality of microscale zero-valent iron particles are 1-45 microns in diameter, preferably an average particle size (D50) of 10 microns or less.

In an embodiment, the microscale zero-valent iron (ZVI) particle comprises an acid-washed iron-based powder. The apparent density of the acid-washed iron-based powder is 0.5 to 5 g/cm$^3$, preferably 1 to 2 g/cm$^3$. The iron-based powder has Fe-content of at least 90% by weight and is a hydrogen-reduced iron powder. Such iron-based powder BET (Brunauer, Emmett and Teller) has a surface area being least 1.6 m$^2$/g. The iron-based powder is present in an amount ranging from 0.05 to 45.0% by weight. In an implementation, the ZVI (powered metal) may be obtained from sponge iron or atomized iron, which are in turn obtained from treatment, reduction, regrinding, etc. of iron ore. In other implementation, the ZVI (powdered metal) may be obtained from waste material like steel mill waste (Kesavan and Azad, 2008). Steel industry waste like dust from Blast Furnace (Shen et al., 2013) and pickling waste liquor (Fang et al., 2011) has been known to be used for preparation of powdered ZVI. The sludge produced in the steel industry, from the Basic Oxygen Furnace (BOF), has high percentage of iron and may be chosen as the starting material for the production of powdered ZVI.

Further, in an embodiment, the surfactant is Aerosol OT and present in the amount ranging from 0.05 to 1.0% by weight. Other examples of surfactants include Fatty acid sulfonates (the most common of which is sodium lauryl sulfate, or SLS), Ethoxylated compounds, such as ethoxylated propylene glycol, Lecithin, Polygluconates, Quaternary ammonium fatty acid adducts (aka ammonium quats, used as fabric softeners), Lignin sulfonates, etc.

Further, in an embodiment, the vegetable oil is a $C_4$-$C_{22}$ oil selected from the group consisting of soybean oil, corn oil, coconut oil, canola oil, peanut oil, sunflower oil, olive oil, garlic oil, crambe oil, rapeseed oil and mixtures thereof. The oil is present in the amount ranging from 33 to 63% by weight.

Further, in an embodiment, the thickening agent is propylene glycol and present in the amount ranging from 21 to 41% by weight.

In alternative implementation of the present subject matter, the zero-valent metal suspension is a ferrous sulfide and zero-valent iron (ZVI) based suspension, interchangeably referred as FeS-ZVI suspension or FeS-ZVI formulation. The suspension comprises about 41 wt. % of zero-valent iron particles and 0.05 to 15.0 wt. % of Mackinawite structured iron sulfide-based reagents. In an example and without limiting the scope of present subject matter, the zero-valent iron may be a uniquely engineered media that has extremely high-porosity, surface area and reactivity, providing exceptional performance. In an example, the size of present ZVI particles is about 1-18 micron (diameter) for propagation into the majority of porous media. The size of microscale Mackinawite structured iron sulfide-based reagents is 1 to 45 microns in diameter, preferably an average particle size (D50) of 10 microns or less. The present ZVI has much higher reactivity and a surface-area than a conventional carbonyl-iron, less-dose is required and the degradation rate of TCE is much faster. The FeS-ZVI suspension can at-least reduce remediation time and provide better longevity for increased-reliability and reduction of injection.

The FeS-ZVI suspension further comprises about 36 by wt % of soybean oil. The 36% by weight of Soybean oil in the suspension is selected as a long-lasting source of carbon and hydrogen required for enhanced reductive de-chlorination and other bioremediation processes. It also serves as a fermentable substrate to create favorable aquifer conditions for anaerobic remediation and provide electrons for extended time. In an example, the soybean oil is refined, bleached, and deodorized (RBD) soybean oil.

The composition further comprises about 23% of propylene-glycol (PG) as an oil thickening agent. In example, the PG may be color-less and able to depress the freezing point of water when mixed with groundwater. PG is also non-corrosive, has very low volatility and very low toxicity. PG is used as a thickener because it serves as a cross-linker between soybean molecules and FeS/ZVI particles, giving the latter a positive buoyancy effect. The composition further comprises about 0.1% surfactant, wherein said surfactant is dioctyl sodium sulfosuccinate (AOT).

Overall, the FeS-ZVI suspension is a reactive-system comprising a food-grade vegetable oil, an oil-thickening agent, and a surfactant that suspend reactive FeS particles, ZVI or other metal particles. Such suspension comprises a liquid membrane formed of the food-grade vegetable oil encapsulating the FeS and ZVI particles as a part of the suspension-network.

In an embodiment, the present matter further illustrates a method for preparing suspension of FeS and zero-valent iron particles in non-aqueous media. The method comprises:
a) preparing a non-aqueous solution by mixing an oil-thickener of about 21 to 41% by weight into a vegetable oil of about 33 to 63% by weight.
b) Thereafter, a surfactant of about 0.05 to 1.0% by weight is dissolved into the solution.
c) A suspension of ZVI particles into a non-aqueous phase is prepared by mixing about 0.05 to 45.0% by weight of the ZVI particles into the non-aqueous solution.
d) Mackinawite structured iron sulfide-based reagents of about 0.05 to 15.0% by weight are further added to thereby result in a FeS-ZVI based suspension FIG. 5 (a and b) illustrates a suspension network comprising the combination of soybean oil, PG and AOT as the continuous phase or oil phase. The ZVI and FeS particles constitute the dispersant phase. The suspension into oil phase at least leads to an increased steric repulsion among the ZVI and FeS particles, while ensuring least increase in viscosity. The surfactant and oil thickener within the suspension lead to increase in positive-buoyancy.

Overall, the FeS-ZVI suspension illustrated by the present subject matter includes long lasting electron donors (soybean oil) and quick release electron donors (PG). The in situ chemical reduction (ISCR) is carried out. The present FeS-ZVI is advantageously used for ISCR. ISCR is a remediation technique that combines both biological processes and FeS and/or ZVI particle-driven abiotic pathways to chemically reduce persistent organic compounds such as chlorinated solvents, pesticides and energetics into harmless end products. The incorporation of FeS and ZVI enhances chlorinated contaminant remediation by enabling various chemical reduction pathways including the abiotic pathways represented in FIG. 4. In order to accomplish rapid and sustained degradation of chlorinated hydrocarbons and other toxic groundwater contaminants, the aforesaid suspension of FeS-ZVI in the non-aqueous system with propylene glycol and soybean oil has been developed with the unique combination of small particles, ease of use, electron donors, and corrosion protected product until emplacement into the groundwater.

In an example, the present FeS-ZVI suspension is suitable for the dechlorination of trichoroethene (TCE), which can be in the form of a dense non-aqueous phase liquid (DNAPL). DNAPLs in the subsurface can act as a source of groundwater contamination. TCE and other contaminants in the form of DNAPL may likewise be remediated using the present suspension. In operation, DNAPL can diffuse into the oil phase of the ZVI suspension, whereupon it reaches the surface of the zero-valent metal particles and activates a dehalogenation process. A hydrocarbon reaction by-product of the dehalogenation reaction, for example ethene, diffuses out of the suspension and vents to the aquifer.

DNAPL and contaminants in other phases in the subsurface may become exposed to the FeS-ZVI suspension in a variety of ways. Firstly, the likely location of the DNAPL is defined, as illustrated through the example provided under FIG. 7. In one embodiment, an FeS-ZVI emulsion is delivered in-situ to contamination pools via a system of at least one injection well as illustrated by example implementations provided in FIG. 7. Injection wells can be permanent structures left in the ground for repeatedly injecting the FeS-ZVI suspension into the ground. The injection wells may contain screen portions through which the FeS-ZVI suspension may pass in order to flow into the subsurface and stay in the vicinity or contact the DNAPL phase. Alternatively, FeS-ZVI suspension may be injected into the DNAPL-impacted aquifer by jetting the fluid through hollow rods that are hammered into the ground using commonly called "direct push" technology. Direct Push machines "push" tools and sensors into the ground without the use of drilling to remove soil to make a path for the tool. A distal portion of the push rods has a series of holes along its length from where the FeS-ZVI suspension flows as it is jetted into the native matrix or subsurface aquifer material. The push rods are advanced further into the soil to cover the vertical extent and depth of the contamination. When the injection of the FeS-ZVI suspension is complete, the push rods are removed from the ground.

As illustrated in FIG. 8, the FeS-ZVI Suspension can be directly mixed with contaminated soils. It can also be used to create a permeable reactive barrier (e.g. as depicted in FIG. 6) by filling a trench with FeS-ZVI suspension or by injecting sufficient FeS-ZVI suspension along a path perpendicular to the expected flow of contaminated groundwater. (As illustrated in FIG. 7).

The forthcoming description of FIGS. 6 to 8 relates to example implementations of ISCR comprising the use of FeS-ZVI suspension in the permeable reactive barriers (PRB); direct injection and direct mixing of the FeS-ZVI suspension into aquifer material for soil and groundwater remediation; and use of FeS-ZVI suspension in fixed bed reactors or filters for treatment of contaminated water.

FIG. 6 is a schematic representation of a method for treating groundwater using a permeable reactive barrier (PRB) and thereby representing example application for the present FeS-ZVI formulation during groundwater remediation. As shown in FIG. 6, the FeS-ZVI suspension can be used in permeable reactive barriers (PRBs) for groundwater treatment. The following Table 1 enumerates various components present therein alongside the reference numerals.

TABLE 1

| Reference numeral | Components |
| --- | --- |
| 18 | Permeable reactive barrier |
| 15, 16 | Permeability funnel structures |
| 20 | A plume of water |
| 21 | Arrow defining direction of water containing plume |

TABLE 1-continued

| Reference numeral | Components |
| --- | --- |
| 22 | Arrow defining direction of flow of water freed of contaminant within the aquifer |
| 24 | Water plume or flow cleaned of contaminants |

Referring to FIG. 6 the permeable reactive barrier (18) of the FeS-ZVI suspension according to the present subject matter is placed downgradient of the contaminated zone. As the contaminated plume travels through the barrier in the direction of arrows (21), it will react with the FeS-ZVI Suspension and contaminants will be removed. Low permeability funnel structures (15, 16) may be emplaced to direct the plume of contaminated water (20) toward the PRB (18). After passing through the permeable barrier (18), the freed-of-contaminant water continues to naturally flow as shown in arrows (22). The aquifer downgradient of the PRB (24) is thus cleaned of contaminants. FIG. 6a, that corresponds to previously referred FIG. 3b, is an enlarged schematic representation of contaminated water contacting particle of the FeS-ZVI suspension according to the present subject matter used in the PRB (18).

FIG. 7 is a schematic representation of a method for groundwater-treatment according to the present FeS-ZVI formulation when introduced into the groundwater via an injection well, thereby illustrating another example application of FeS-ZVI formulation during ground water remediation, in accordance with an embodiment of the present disclosure. The following Table 2 enumerates various components present therein alongside the reference numerals.

TABLE 2

| Reference numeral | Components |
| --- | --- |
| 36 | An injection point |
| 40 | An injection, extraction or monitoring well |
| 31 | Water Table |
| 32 | Arrow defining direction of ground water flow |
| 30 | Contaminants |
| 34 | Plume of contaminated water |
| 38 | Injection Device |

As shown in FIG. 7, an injection point (36) is provided upstream of a monitoring or extraction well (40) potentially used to retrieve groundwater for human use. The injection well (36) is drilled or dug so it intercepts the groundwater containing contaminants. Groundwater flows in the direction represented by arrow (32). The aquifer becomes contaminated as a contaminant source (30) typically originates on the surface and flows downward through soils until it reaches the water table (31). Contaminants (30) enter aquifer and move both downwards as DNAPLs and in the direction of groundwater flow as dissolved phase contamination to form a contaminated groundwater plume (34). The injection point (36) has been used to distribute FeS-ZVI suspension in the aquifer using an injection device (38), to a depth necessary to intercept and treat the contaminated water plume (34). The contaminated plume will be treated by the FeS-ZVI suspension and thereafter, these contaminants are precluded from flowing with groundwater and arriving to the production well (40). FIG. 7a, which refers to FIG. 3b, is an enlarged schematic representation of a contaminated-water contacting particle of the FeS-ZVI suspension that has been injected into the ground through the point (36).

In an implementation of the process depicted in FIG. 7, as a part of the injection at-least one injection-point is advanced into said aquifer. The injection may be performed by a technique selected from one or more of at least one push-rod, at said at least one injection-point, an injection through well, a French drain type system, deep tilling, an hydraulic-injection, a multi-phase inert gas injection, an aerosol injection, a water injection, at least one pump, at least one blower, at least one compressor, tank, at least one tank of compressed gas, at least one compressed gas tank after a blower or compressor, a direct push rig, at least one hand-held injection rod, and a combination of one or more aforesaid techniques. Further, in an example, the introduction of FeS-ZVI formulation is performed at a pressure between approximately 10 psi and approximately 1,000 psi.

FIG. 8 (a to c) is a schematic-representation of a method for soil-treatment according to the present FeS-ZVI formulation when introduced below the earth's surface, thereby illustrating another example application of FeS-ZVI formulation during in-situ soil remediation, in accordance with an embodiment of the present-disclosure. More specifically, the present FIG. 8 is a conceptual-model depicting FeS-ZVI and Clay soil-mixing as an in situ remediation technology for remediation of chlorinated dense non-aqueous phase liquids (DNAPLs).

Figure 8B:
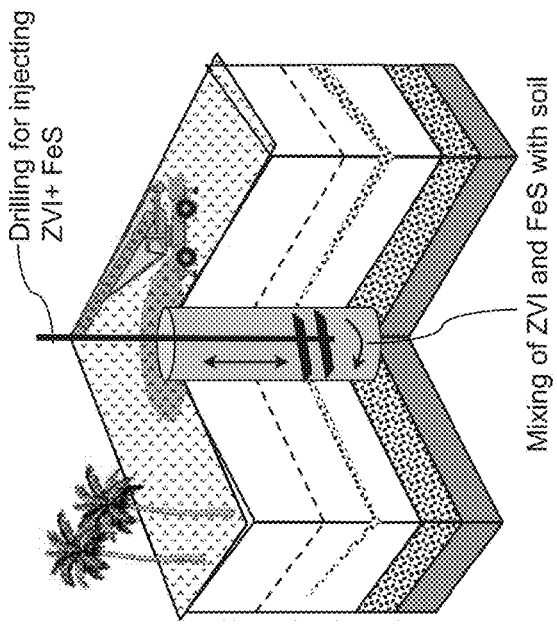
FIG. 8b shows FeS-ZVI-electron donor application upon drilling operation.
Figure 8A:
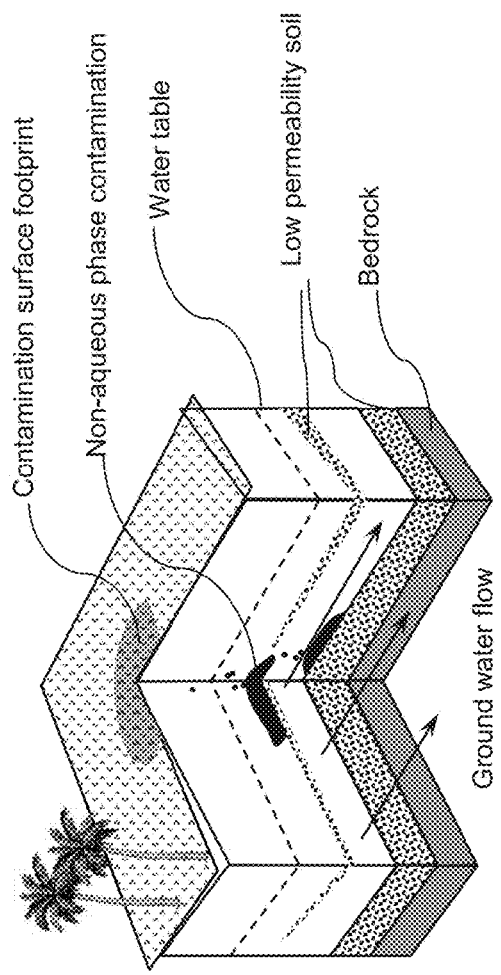
FIG. 8a illustrates progression of the contaminant into sub-surface and migration onto specific-layers with respect to bed-rock, water-table, and ground water-flow.

FIG. 8a illustrates a heterogeneous subsurface before soil-mixing and thereby depicts a footprint of contaminated soils. More specifically, FIG. 8a illustrates progression of the contaminant into sub-surface and migration onto specific-layers with respect to bed-rock, water-table, and ground water-flow. FIG. 8b illustrates the FeS-ZVI application upon drilling operation and thereby depicts the process of soil-mixing using augers or special tools to mechanically-mix the soil with FeS-ZVI. The process simultaneously breaks up the soil without removing it, injects the FeS-ZVI at low pressure and thoroughly mixes the FeS-ZVI with the soil. Single or multiple mixing tools (auger, blades, rotary head) are used to directly inject ZVI into the mixing zones.

Figure 8C:
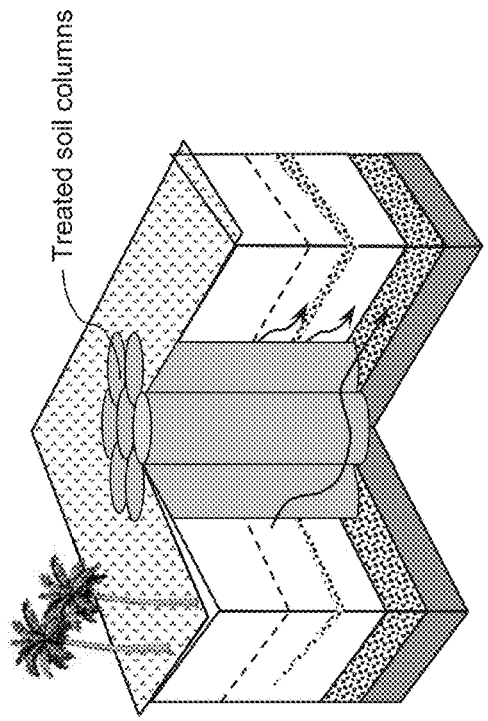
FIG. 8c depicts a complete installation of treated soil columns.

In an example, the present mechanism combines abiotic-degradation (via FeS, zero-valent iron, ZVI, addition) and immobilization (via soil-mixing and clay-addition). The FeS-ZVI clay soil-mixing technology provides a delivery-mechanism that mechanically reduces subsurface heterogeneities. FIG. 8c depicts a complete-installation of treated soil columns and thereby illustrates a homogenized low-permeable subsurface after soil-mixing with bypassing groundwater, thereby depicting treated soil-columns. The FeS-ZVI clay soil-mixing technology at least proves efficient for source mass depletion in the presence of DNAPL The FeS-ZVI suspension has been proven to effectively degrade halogenated solvents. For example, the mechanism and reaction rates of which iron reduces chlorinated aliphatics has been studied extensively due to iron's low-cost and low toxicity. The half reaction of ($Fe^0$) to ($Fe^{+2}$) (Equation 1) has a reduction-potential of −0.440V. The estimated standard reduction potentials of alkyl halides at a pH of 7, as in Equation 2, ranges from +0.5 to +1.5V. Therefore, the net reaction (Equation 3) is thermodynamically favorable and is referred as anaerobic dechlorination. Equation 4 is referred as hydrolysis. The reductive dechlorination activity of ZVI is governed by the iron surface components and properties.

$$Fe^0 \longrightarrow Fe^{2+} + 2e^- \tag{1}$$

$$R\text{—}Cl + 2e^- + H^+ \longrightarrow R\text{—}H + Cl^- \tag{2}$$

$$Fe^0 + R\text{—}Cl + H^+ \longrightarrow Fe^{2+} + R\text{—}H + Cl^- \tag{3}$$

$$Fe^0 + 2H^+ \rightarrow Fe^{2+} + H_2 \tag{4}$$

Notably, anaerobic dechlorination (Equation 3) and hydrolysis (Equation 4) are usually accompanied with pH increase and ferrous ions accumulation. Hydrogen-peroxide formed as a result of reduction of oxygen reacts with accumulated ferrous-ions (i.e. $Fe^{+2}$) to form $Fe^{+3}$ and hydroxyl radicals that are highly reactive oxidants to degrade aqueous phase TCE and/or oxidize TCE in the presence of the soil.

In an example, ZVI can react directly with sulfate via abiotic reaction (Equation 5). More significantly, ZVI reacts with water to produce $H_2$ and ferrous iron (Equation 6), after which sulfate is reduced by $H_2$ to sulfide via microbially-mediated reactions and forms iron sulfide precipitates (Equation 7)

$$Fe^0(S) + \frac{1}{4}SO_4^{2-b} + {}^{+2}H + \rightarrow \frac{1}{4}FeS(S) + \frac{3}{4}Fe^{2+} + 10\ H_2O \qquad (5)$$

$$Fe^0(S) + 2H_2O \rightarrow Fe^{2+} + H_2 + 2OH^- \qquad (6)$$

$$2Fe^{2+} + SO_4^{2-} + 4H_2 \rightarrow Fe\ S(S) + 4H_2O \qquad (7)$$

The abiotic-pathways due to FeS have been illustrated within the description of FIG. 4.

Further, as it is known, in situ biogeochemical transformation refers to processes in which contaminants are degraded by abiotic-reactions with minerals formed that are either naturally occurring or are biogenically produced in the subsurface. Natural aquifer systems are complex ecosystems with a plethora of microbial-communities. Such microbial-communities are subject to a wide variety of changes as the environment of the aquifer is altered. The present FeS-ZVI formulation may be used to take advantage of the degradation capabilities of these microbial communities for a synergistic-degradation effect of target contaminants present in the aquifer.

A variety of different-substrates (e.g. electron donors such as vegetable oil) have been used to stimulate anaerobic-bioremediation. In practice, the added organic substrates are first fermented to hydrogen ($H_2$) and low-molecular weight fatty acids. These short-chain molecules, such as acetate, lactate, propionate, and butyrate, in turn provide carbon and energy for anaerobic bioremediation. In an example, the substrates may be categorized into four types: soluble substrates, viscous or low viscosity substrates, solid substrates, and miscellaneous experimental substrates. All of these substrates are biodegraded and ultimately yield hydrogen.

The present FeS-ZVI suspension formulation is such that the iron particles will suffer limited corrosion and limited exposure to water and oxygen during packaging, transport and storage. Corrosion on FeS and ZVI prior to its intended use decreases its cleaning performance. However, the present suspension offers logistical, economic and performance advantages, as the formulation protects the iron particles from corrosion until it is applied and used for remediation.

Further, the present FeS-ZVI suspension is a stable suspension and free from the constraints of particle agglomeration, sedimentation and deposition as otherwise suffered by conventional ZVI based compositions. Such an improvement at-least facilitates an ease of logistics that accomplishes a dual purpose of single stage treatment in field operations and safe transportation for FeS and ZVI particles. Mixing amendments from different sources to prepare fluid systems in the field for remedial processes drastically increases logistical issues and complexity for any field projects and is much-less favourable for environmental clean-up operations. In contrast, the present FeS-ZVI suspension formulation provides significant improvements and synergism from the benefits of soybean oil (as a long lasting electron donor for biological treatment of contaminants) and propylene glycol (a quick release electron donor for biological treatment of contaminants).

In summary, the present FeS-ZVI suspension scores over the conventional ZVI formulations and applications at least based on presence of long lasting electron donors, quick release electron donors, corrosion-free environment during packaging, ease of logistics (single stage and easy to handle final product).

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

To the extent that method or apparatus embodiments herein are described as having certain numbers of elements, it should be understood that fewer than all of the elements may be necessary to define a complete claim. In addition, sequences of operations or functions described in various embodiments do not require or imply a requirement for such sequences in practicing any of the appended claims. Operations or functions may be performed in any sequence to effectuate the goals of the disclosed embodiments.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the forthcoming claims.

The invention claimed is:

1. A method for accelerated in-situ chemical reduction and anaerobic biodegradation of subsoil matter, comprising the steps of:
   a. supplying a mixture comprising a vegetable oil, an oil thickening agent and a surfactant forming a suspension network for ferrous sulfide and zero-valent metal particle reactants, into soil pathways by injecting the mixture into an aquifer to abiotically and biologically react with dissolved contaminates in groundwater, wherein said suspension network comprises ferrous sulfide and zero-valent metal particles encapsulated within a liquid membrane formed of the vegetable oil; and
   b. supplying an organic hydrogen donor into the soil pathways to produce anaerobic conditions to cause indigenous anaerobic bacteria to biodegrade residual concentrations of the contaminates.

2. The method as claimed in claim 1, wherein the contaminates are at least one of chlorinated solvents, haloalkanes, perchlorate, energetics, Energetics (DNT, HMX, Nitroglycerine, Perchlorate, RDX, and TNT), uranium, chromium, nitrate.

3. The method as claimed in claim 1, wherein said ferrous sulfide is iron sulfide or iron (II) sulfide, ferrous sulfide.

4. The method as claimed in claim 1, wherein said ferrous sulfide is Mackinawite structured iron sulfide-based reagents.

5. The method as claimed in claim 1, wherein the organic hydrogen donor are low-molecular-weight organic compounds selected from the group consisting of lactate, acetate, methanol, formate, glycerol, glucose and combinations thereof.

6. The method as claimed in claim 1, wherein the organic hydrogen donor are high-molecular-weight organic compounds C4-C22 vegetable oil selected from the group consisting of soybean oil, coconut oil, rapeseed (canola) oil, peanut oil, crambe oil, sunflower oil and combinations thereof.

7. The method as claimed in claim 1, wherein the steps of supplying said mixture and said organic hydrogen donor comprises:
   placing an injection rod into the soil; and
   injecting said mixture and said organic hydrogen donor under pressure through the injection rod.

8. The method as claimed in claim 7, further comprising a preliminary step of injecting a gas under pressure through said injection rod and into said soil to establish preferential delivery pathways therein.

9. A composition for a ferrous sulfide and zero-valent metal suspension comprising:
   a. a ferrous sulfide;
   b. a particulate zero—valent metal;
   c. a surfactant;
   d. a vegetable oil; and
   e. a thickening agent.

10. The suspension as claimed in claim 9, wherein said ferrous sulfide is Mackinawite structured iron sulfide—based reagents.

11. The suspension as claimed in claim 9, wherein the ferrous sulfide is present in an amount ranging from 0.05 to 15.0% by weight.

12. The suspension as claimed in claim 9, wherein said zero-valent metal particles are a plurality of microscale zero-valent metal particles, preferably and the metal particles are iron-based powder.

13. The suspension as claimed in claim 12, wherein said plurality of microscale zero-valent iron particles are 1-45 microns in diameter.

14. The suspension as claimed in claim 12, wherein the microscale zero-valent iron (ZVI) particle comprises an acid—washed iron-based powder.

15. The suspension as claimed in claim 12, wherein the apparent density of the acid-washed iron-based powder is 0.5 to 5 g/cm$^3$.

16. The suspension as claimed in claim 12, wherein the iron-based powder has an Fe-content of at least 90% by weight.

17. The suspension as claimed in claim 12, wherein the iron-based powder is a hydrogen-reduced iron powder.

18. The suspension as claimed in claim 12, wherein the iron-based powder BET (Brunauer, Emmett and Teller) surface area is least 1.6 m$^2$/g.

19. The suspension as claimed in claim 12, wherein the iron-based powder is present in an amount ranging from 0.05 to 45.0% by weight.

20. The suspension as claimed in claim 9, wherein said surfactant is dioctyl sodium sulfosuccinate (Aerosol OT).

21. The suspension as claimed in claim 20, wherein the surfactant is present in an amount ranging from 0.05 to 1.0% by weight.

22. The suspension as claimed in claim 9, wherein said vegetable oil is a C4-C22 oil selected from the group consisting of soybean oil, corn oil, coconut oil, canola oil, peanut oil, sunflower oil, olive oil, garlic oil, crambe oil, and mixtures thereof.

23. The suspension as claimed in claim 22, wherein the oil is present in the amount ranging from 33 to 63% by weight.

24. The suspension as claimed in claim 9, wherein said thickening agent is propylene glycol.

25. The suspension as claimed in claim 24, wherein the thickening agent is present in an amount ranging from 21 to 41% by weight.

26. A reactive system for remediation of soil and ground water comprising vegetable oil, an oil thickening agent and a surfactant forming a suspension networks for ferrous sulfide and zerovalent metal particle reactants, wherein said suspension network comprises ferrous sulfide and zero valent metal particles encapsulated within a liquid membrane formed of the vegetable oil.

27. The reactive system of claim 26, comprising: 0.05 to 15% by weight ferrous sulfide, 0.05 to 45.0% by weight zero-valent metal particles, 0.05 to 1.0% by weight surfactant, 33 to 63% by weight vegetable oil, and 21 to 41% by weight an oil-thickening agent.

28. The reactive system of claim 26, wherein said ferrous sulfide particles are microscale Mackinawite structured iron sulfide-based reagents.

29. The reactive system of claim 28, wherein said microscale Mackinawite structured iron sulfide-based reagents are 1 to 45 microns in diameter.

30. The reactive system of claim 26, wherein said zero valent metal particles are microscale iron-based powders.

31. The reactive system of claim 30, wherein said microscale iron—based powders are 1 to 45 microns in diameter.

32. The reactive system of claim 26, wherein said surfactant is dioctyl sodium sulfosuccinate (Aerosol OT).

33. The reactive system of claim 27, wherein said suspension networks include the propylene glycol as said thickening—agent.

34. The reactive system of claim 27, wherein said liquid membrane is formed of a C4-C22 vegetable oil selected from the group consisting of soybean oil, corn oil, coconut oil, canola oil, peanut oil, sunflower oil, olive oil, crambe oil, and mixtures thereof.

35. A method for preparing suspension of ferrous sulfide and ZVI particles in media comprising the steps of:
   a. preparing a non-aqueous solution by mixing an oil thickener of about 21 to 41% by weight into a vegetable oil of about 33 to 63% by weight;
   b. dissolving a surfactant of about 0.05 to 1.0% by weight into the solution;
   c. preparing a suspension of ZVI particles into a non-aqueous phase by mixing the ZVI particles of about 0.05 to 45.0% by weight into said non—aqueous solution; and
   d. adding 0.05 to 15.0% by weight Mackinawite structured iron sulfide-based reagents.

36. A method for treating contaminated soil and water based on the suspension as claimed in claim 35, the method comprising the step of:
   introducing said ferrous sulfide and ZVI suspension into contaminated soil and water.

37. The method of claim 36, wherein said method further comprises a step of:
   advancing at least one injection point into an aquifer, said advancing performed by a technique selected from the group consisting of one push rod, at said at least one injection point, an injection through a well, a French drain type system, deep tilling, an hydraulic injection, a multi-phase inert gas injection, an aerosol injection, a water injection, at least one pump, at least one blower, at least one compressor, tank, at least one tank of compressed gas, at least one compressed gas tank after a blower or compressor, a direct push rig, at least one hand-held injection rod, and combinations thereof.

38. The method of claim 36, wherein said introducing step is performed at a pressure between approximately 10 psi and approximately 1,000 psi.

* * * * *